Figure 1:
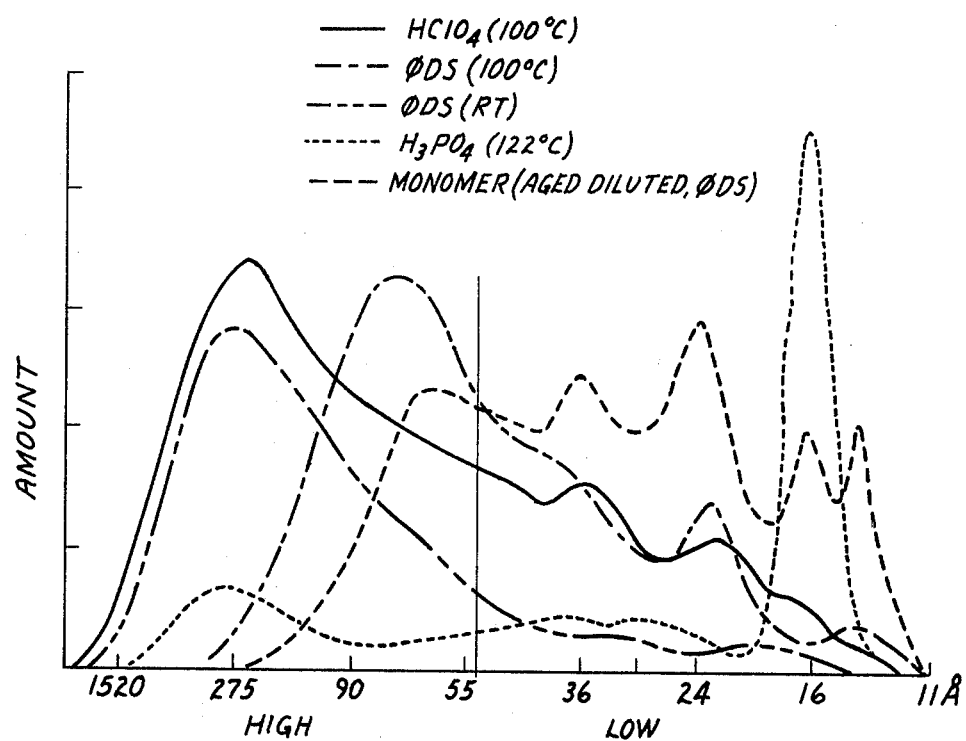
Figure 2:
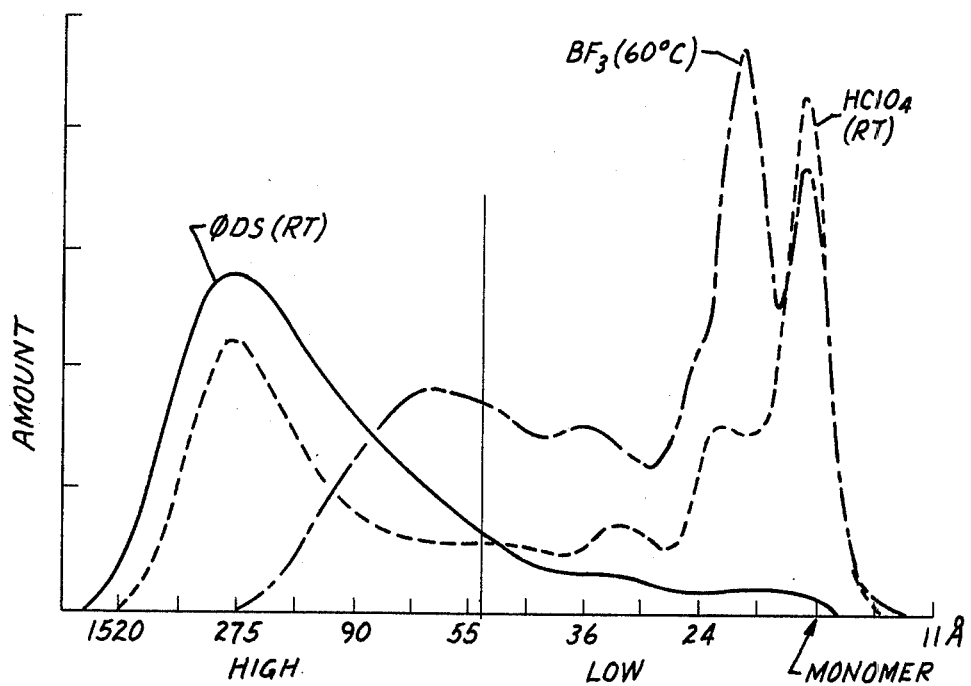
Figure 3:
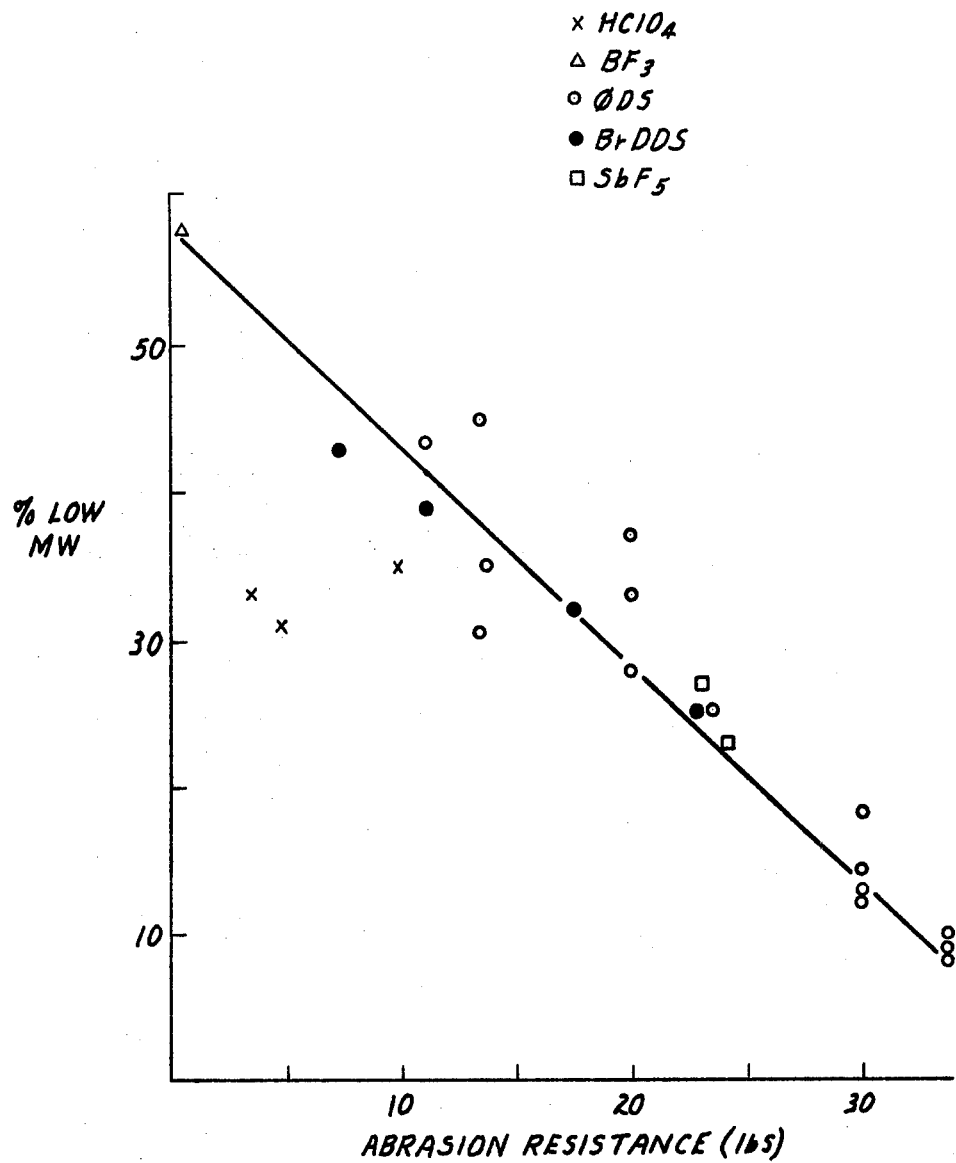

United States Patent [19]

Robins et al.

[11] 4,100,134

[45] Jul. 11, 1978

[54] STORAGE-STABLE EPOXY-TERMINATED SILANE PREPOLYMER

[75] Inventors: Janis Robins, St. Paul; J. Lamar Zollinger, Maplewood, both of Minn.

[73] Assignee: Minnesota Mining and Manufacturing Company, St. Paul, Minn.

[21] Appl. No.: 782,079

[22] Filed: Mar. 28, 1977

[51] Int. Cl.² .............................................. C08G 77/04
[52] U.S. Cl. ...................................... 528/10; 528/11; 528/23
[58] Field of Search .............. 260/2 A, 46.5 R, 46.5 Y

[56] References Cited

U.S. PATENT DOCUMENTS

| | | | |
|---|---|---|---|
| 3,586,616 | 6/1971 | Kropp | 260/2 A X |
| 3,632,843 | 1/1972 | Allen et al. | 260/2 A |
| 3,955,035 | 5/1976 | Ito et al. | 428/334 |

*Primary Examiner*—Lewis T. Jacobs
*Attorney, Agent, or Firm*—Cruzan Alexander; Donald M. Sell; Mark A. Litman

[57] ABSTRACT

Epoxy prepolymers having particular ranges of physical properties and derived from epoxy-terminated silanes and/or copolymers form high quality abrasion resistant coatings when subsequently hydrolyzed.

22 Claims, 3 Drawing Figures

STORAGE-STABLE EPOXY-TERMINATED SILANE PREPOLYMER

Improvements have recently been made in the performance of abrasion resistant coatings through the use of polymers derived from epoxy-terminated silanes. These polymers have been reported (e.g., U.S. Pat. No. 3,955,035, U.S. application Ser. Nos. 513,116, filed Oct. 8, 1974, now abandoned, and 556,392, filed Mar. 7, 1975, now abandoned) to have good optical qualities, solvent resistance, and abrasion resistance. The polymers are formed by directly polymerizing or copolymerizing the monomer with an appropriate catalyst (U.S. Pat. No. 3,955,035 and Ser. No. 556,392), by polymerizing or copolymerizing a silane precondensate of the monomer (Ser. Nos. 556,392 and 513,116), by polymerizing an epoxy prepolymer of the monomer (U.S. Pat. No. 3,955,035), or by reacting particular materials into the polymer structure (Ser. No. 513,116). Each of these different methods and polymers has its own particular application requirements and produces distinctive results.

This invention relates to an improvement in the performance of one of these prior art techniques. In particular, novel prepolymer compositions and novel applications thereof have been found.

U.S. Pat. No. 3,955,035 is the only prior art known which discusses the use of prepolymers of the epoxy-terminated silanes in forming abrasion resistant coatings. These prepolymers are formed by the reaction of the epoxy functionality of the monomer without significant hydrolysis of the silane moieties. The prepolymer is formed in this patent by heating a mixture of the epoxy-silane, a ring opening catalyst (for the epoxide) and, if desired, a solvent for the silane. The reaction is stopped when the composition has reached about 500 to 2000 cp by cooling the material and excluding air (particularly moisture which will hydrolyze the silane). Heating during prepolymerization is within the temperature range of 35°–200° C. Numerous catalysts are suggested as useful for the general polymerization but ring-opening catalysts are described only generically. The use of prepolymer compositions made according to this prior art technique produces good abrasion resistant coatings compared to non-epoxy-terminated silane compositions, but the quality of the coatings is far inferior to those which ought to be obtained from the composition.

It has been found in the practice of the present invention that certain physical parameters in the prepolymer are critical to the properties obtained in the final cured coatings. These properties are not disclosed or enabled by the teachings of U.S. Pat. No. 3,955,035. More specifically it has been found that prepolymer compositions should contain less than 30% by weight of low molecular weight materials (excluding inert solvents). Low molecular weight materials are defined as those molecules derived from the reactants which when eluted with tetrahydrofuran in gel permeation chromatography techniques through equipment calibrated with polystyrene are eluted in the same or lesser number of counts as polystyrene having a molecular size of less than 50 A. When the quantitative description of Angstrum units are used in this description of the invention, the units refer to the relative units determined through gel permeation chromatography techniques. Hardness of the final coating has been found to be correlatable to the percent of low molecular weight materials present in the prepolymer.

Additionally, the prepolymers must be storage stable. Storage stability is defined for compositions in the practice of this invention as the ability to be maintained in methylene chloride solution at a solids weight of no more than 33% in a moisture free environment for 30 days at ambient temperatures (15°–20° C), initially having a viscosity of less than 10,000 cp, without the composition gelling to a viscosity in excess of 25,000 cp. Viscosity in the practice of this invention is measured in a Brookfield viscometer with a number 6 spindle at 10 rpm. No solvent is needed with the prepolymer during this measurement. Even one-half percent by weight of water in the composition will cause such gellation within a week, even where the initial viscosity is below 2000 cp. Prepolymer compositions of the present invention should have viscosities of less than 15,000 cp, preferably less than 10,000 cp and most preferably less than 5000 cp.

These and other facets of the present invention will become more clear upon a reading of the examples.

EPOXY-TERMINATED SILANES

Epoxy-terminated silanes are compounds or materials having polymerizable (preferably terminal) epoxy groups and terminal, polymerizable silane groups, the bridging of these groups being through a non-hydrolyzable aliphatic, aromatic, or aliphatic and aromatic divalent hydrocarbon linkage which may have O atoms in the linkage chain. The O atoms for example would be within the chain only as ether linkages. These linkage chains may be generally substituted as it is well known in the art that these substituents on the chain do not greatly affect the functional ability of the epoxy-terminated silanes to undergo the essential reactions necessary to polymerization through the siloxane or epoxy terminal groups. Examples of substituents which may be present on the linkage or bridging moieties are groups such as $NO_2$, $CH_3(CH_2)_nCH_2$, methoxy, halogen, etc. In structural formulae describing materials used in this invention, such substitution of the bridging moieties is implied unless specifically excluded by language such as "unsubstituted divalent hydrocarbon radical."

Examples of preferred epoxy-terminated silanes useful in the practice of this invention are compounds of the general formulae:

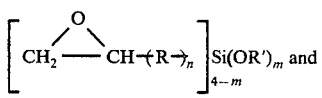 and

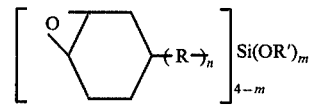

where R = a non-hydrolyzable divalent hydrocarbon radical (aliphatic, aromatic, or aliphatic and aromatic containing) of less than 20 carbon atoms or a divalent radical of less than 20 carbon atoms composed of C, H, S, and O atoms (these atoms are the only atoms which may appear in the backbone of the divalent radicals), the last being in the form of ether linkages. No two heteroatoms may be adjacent within the backbone of the divalent hydrocarbon radical. This description defines divalent hydrocarbon radicals for epoxy terminated siloxanes in the practice of this invention. The value of n is from 0 to 1, R' is an aliphatic hydrocarbon radical of less than 10 carbon atoms, an acyl radical of less than 10 carbon atoms, or a radical of formula (CH$_2$CH$_2$O)$_k$Z in which k is an integer of at least 1 and Z is an aliphatic hydrocarbon radical of less than 10 carbon atoms or hydrogen, m has values of 1 to 3.

The compositions employed in this invention can be an epoxy silane of the above formula in which R is any divalent hydrocarbon radical such as methylene, ethylene, decalene, phenylene, cyclohexylene, cyclopentylene, methylcyclohexylene, 2-ethylbutylene, and allene or an ether radical such as —CH$_2$—CH$_2$—O—CH$_2$—CH$_2$—, —(CH$_2$—CH$_2$O)$_2$—CH$_2$—CH$_2$—,

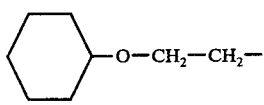

and —CH$_2$O—(CH$_2$)$_3$—, R' can be any aliphatic hydrocarbon radical of less than 10 carbon atoms such as methyl, ethyl, isopropyl, butyl, vinyl, alkyl, or any acyl radical of less than 10 carbon atoms such as formyl, acetyl, propionyl, or any radical of the formula (CH$_2$CH$_2$O)$_k$Z in which k is an integer of at least 1, for example 2, 5, and 8, and Z is hydrogen or any aliphatic hydrocarbon radical of less than 10 carbon atoms such as methyl, ethyl, isopropyl, butyl, vinyl and allyl.

The following compounds are illustrative of some of useful materials in the process of this invention and should not be construed as limiting the invention which is properly explained above:

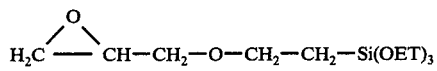

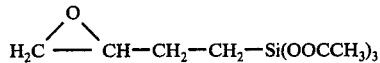

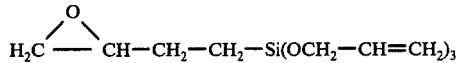

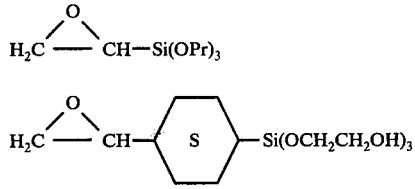

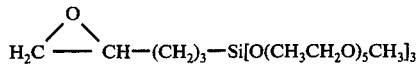

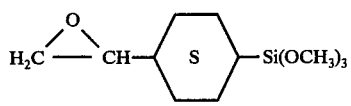

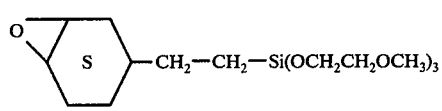

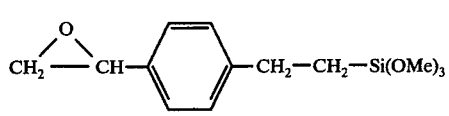

-continued

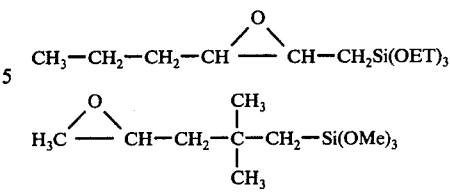

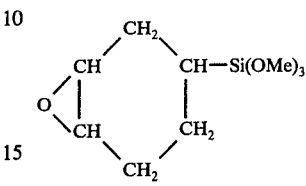

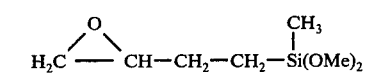

PREFERRED CATALYST

The most preferred catalysts useful according to the broadest aspects of the present invention are highly fluorinated aliphatic sulfonylic compounds. The sulfonylic materials are defined as compound containing two highly fluorinated aliphatic sulfonyl groups attached directly to an imide or methylene (e.g., —NR'— or —CR'R"). The sulfonylic catalysts may be partially represented by the formula (R$_f$SO$_2$)—Q—(SO$_2$R'$_f$)

wherein Q is a divalent radical selected from

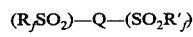

wherein R" is selected from hydrogen, clorine, bromine, iodine, R$_f$SO$_2$—, alkenyl of 3–4 carbon atoms, alkyl of 1 to 20 carbon atoms (preferably 1 to 4), aryl of 1 to 20 carbon atoms, (preferably to 10, and for example, phenyl, naphthyl, pyridyl, benzthienyl, etc.), and alkaryl of 7 to 20 carbon atoms (preferably to 10), R' is selected from hydrogen, chlorine, bromine, iodine, ammonium cations or metal cations, and R$^3$ is H, alkenyl (3 to 4 carbon atoms) or aryl up to 20 carbon atoms.

The catalysts wherein the N or C atom bonded to the highly fluorinated aliphatic (preferably alkyl) group has a hydrogen atom bonded thereto are active catalysts. Those having no hydrogen atom are latent and may be activated by heat, acid, chelating agent or combinations thereof as known in the art.

Metals useful in the above definitions essentially includes all metals. All metals inclusive of and to the left of aluminum, geranium, antimony and polonium on the periodic chart of the elements, and the rare earth metals can function in the practice of this invention. The group Ia and IIa metals must be activated by acids and heat or chelating agents and heat, but they are functional. Examples of many metals, including lanthanum, are provided to show that all metals will work, even though some would be commerically useless because of expense. Preferably the metals would exclude elements 59–63, 65–71, and those above 89.

According to the Periodic Table in *Advanced Inorganic Chemistry*, Cotton and Wilkinson, 2d. Ed. Interscience Publishers, 1966, more preferred metals would be those of Groups Ia, IIa, IIIa, Ib, IIb, IVb, and Vb and lanthanum, titanium, zirconium, chromium, molybdenum, manganese, cesium, and gadolinium based on economic considerations.

In the practice of this invention, $R_f$ and $R'_f$ are independently defined by highly fluorinated aliphatic radical which encompasses fluorinated, saturated, monovalent, aliphatic radicals having 1 to 20 carbon atoms. The skeletal chain of the radical may be straight, branched or, if sufficiently large (e.g., at least 3 to 5 atoms) cycloaliphatic, and may be interrupted by divalent oxygen atoms or trivalent nitrogen atoms bonded only to carbon atoms. Preferably the chain of the fluorinated aliphatic radical does not contain more than one hetero atom, i.e., nitrogen or oxygen, for every two carbon atoms in the skeletal chain. A fully fluorinated group is preferred, but hydrogen or chlorine atoms may be present as substituents in the fluorinated aliphatic radical provided that not more than one atom of either is present in the radical for each carbon atom. Preferably, the fluoroaliphatic radical is a saturated perfluoroalkyl radical having a skeletal chain that is straight or branched and has a formula $$C_xF_{2x+1}$$

wherein x has a value from 1 to 18.

The preferred active catalysts of this invention are those compounds having the formula $$(R_fSO_2)Q(O_2SR'_f)$$

wherein $R_f$ and $R'_f$ are independently a highly fluorinated alkyl group, and Q is a divalent radical selected from —NH— and —CHR—, wherein R is selected from Br, Cl, I, H, alkyl groups of 1 to 20 carbon atoms (preferably 1 to 4), alkenyl of 3 to 4 carbon atoms, aryl or aralkyl of up to 20 carbon atoms (preferably up to 10), or R'X, wherein R' is an alkylene group of up to 20 carbon atoms (preferably 1 to 4) and X is H, Br, Cl, I, —O$_2$SR$_f$, —CH(O$_2$SR$_f$)$_2$,

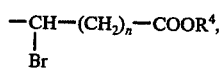

or —CY(COOR$^2$)$_2$ wherein R$^4$ is H or 1 to 8 alkyl and n is 0 to 8, and wherein R$^2$ is alkyl of 1 to 4 carbon atoms or phenylalkyl, the alkyl group of which has 1 to 4 carbon atoms, and Y is H, Br, Cl, I, or NO$_2$.

Ammonium cation as used in the present invention is defined as cations of ammonia, primary, secondary, tertiary and quaternary amines. Alkyl, aryl, alkaryl, etc., as used in the present invention (excluding $R_f$ type groups as elsewhere defined) includes such simple substituted groups as are recognized in the art as functional equivalents of the groups (e.g., —CH$_2$CH$_2$CH$_2$Cl;

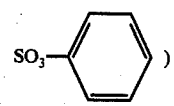

insofar as its function in the present invention is concerned.

Illustrative bis(perfluoroalkyl sulfonyl) protonic acids are:

Bis(trifluoromethylsulfonyl)methane
Tris(trifluoromethylsulfonyl)methane
Bis(trifluoromethylsulfonyl)imide
Bis(trifluoromethylsulfonyl)chloromethane
Bis(trifluoromethylsulfonyl)phenylmethane
Bis(perfluorobutylsulfonyl)methane
Bis(perfluorobutylsulfonyl)imide
Perfluorobutyltrifluoromethylmethane
Perfluorobutyltrifluoromethylimide
Ethyl 6,6-Bis(perfluoromethyl sulfonyl)-4-bromohexanoate
Methyl 4,4-Bis(perfluoromethyl sulfonyl)-2-carboxy-2-bromobutanoate
Ethyl 4,4-Bis(perfluoromethyl sulfonyl)-2-carboethoxy-2-nitrobutanate
1,1,2,2-Tetra(trifluoromethylsulfonyl)ethane Selection of a most preferred perfluoroalkylsulfonyl methane catalyst is dependent on the particular monomer composition in which the catalyst is to be used and the application for which the composition is to be used.

Although their use is not necessary in the compositions of the invention to effect a cure of coatings of the composition, it is often preferable to include in addition to the fluoroalkylsulfonyl protonic acid catalysts from about 0.01 to 5 percent and preferably about 0.1 to 2 percent of a second siloxane hydrolysis and condensation catalyst such as SbCl$_3$, SbCl$_5$, and HCl. As is illustrated in the examples, some combinations of catalysts provide desirable effects allowing for increased rate of cure over that obtainable by the fluoroalkylsulfonyl protonic acid catalyst alone. Siloxane hydrolysis and condensation catalysts are well known and include among others organotin compounds (see U.S. Pat. No. 3,664,997) such as bis(acetoxydibutyltin) oxide, bis[dibutyl(hexyloxy)tin]oxide, phenylbutoxytinhydroxide and the like; metal salts (see U.S. Pat. Nos. 3,719,635 and 3,772,240) such as lead 2-ethylhexoate, dibutyltin dilaurate, zinc naphthenate, zirconium octoate, tetraphenyltitanate, and the like; sulfur-containing organo tin compounds (see U.S. Pat. No. 3,499,870) such as (C$_4$H$_9$)$_2$Sn [SCH$_2$COOC$_4$H$_9$]$_2$ and the like; other catalysts such as those disclosed in U.S. Pat. Nos. 3,433,758 (vanadium compounds); 3,714,212 (cobalt-platinum compounds);etc. Conventional homopolymerization epoxy catalysts may also be added, but usually with no significant improvement observed.

EXAMPLES

Four different methods were used to prepare the prepolymers. These methods were based upon the available prior art disclosures on the use of epoxy-terminated silanes and the only known disclosure for the preparation of the prepolymers.

A. 1.0 gram of catalyst was dissolved in 10 g methylene chloride and the solution added to 100 g of gamma-glycidoxypropyltrimethoxy silane. The final solution was aged for 20 hours at room temperature. The reaction temperature rose to 50°–80° C and then decreased to room temperature. The product was then diluted to 33% by weight in methylene chloride. In the absence of moisture, these solutions are stable.

B. One part 70% perchloric acid was dissolved in 5 parts chloroform and 5 parts acetone then cooled to 0° C. This solution was mixed with 100 parts gamma-glycidoxypropyltrimethoxy silane cooled to 0° C. This mixture was heated to 100° C ±10° for four hours. When the viscosity increased to at least 500 cp, the mixture was cooled and diluted with methylene chloride to 33% by weight solids.

C. 1.0 g of catalyst was dissolved in methylene chloride and added to 100 g of gamma-glycidoxypropyltrimethoxy silane. Reaction temperatures were maintained at specified levels for 2 hours (30°, 40°, 50°, 70°, or 100° C). The solution of the prepolymer was then cooled, aged overnight, and diluted to 33% by weight solids in methylene chloride.

D. 1.0 g of phenyl disulfone was added to 100 g gamma-glycidoxypropyltrimethoxy silane, aged for 20 hours at room temperature and diluted to 33% by weight solids with methylene chloride.

Abrasion resistance is measured in these examples as the force in pounds per square inch on a sample of 000 steel wool necessary to cause visible scratching on the coating. Square inch (5.45 cm$^2$) samples with various weights on them are oscillated in 3.75 cm strokes (forward and back) across the coating 100 times in each test. New areas of each coating were used for each evaluation when scatching was not observed with the first weight tested.

When the compositions made by method B were stored at anhydrous ambient conditions, they consistently gelled into a solid mass and discolored within a week. This is in large part because perchloric acid must contain some moisture which hydrolyzes the silane groups on the prepolymer. None of the solutions produced by the perchloric acid catalysts were storage stable. This is further evidence that a moisture content of less than 0.5% and preferably less than 0.25% is desirable in the compositions of the present invention to further assure storage stability.

Molecular weight distributions and percentages were determined with a gel permeation chromatograph (GPC). Commercially available instruments perform this evaluation by separating polymeric species according to molecular size (which with known monomeric species can be correlated to molecular weight). Dilute solutions (one-eight to one-half percent) of the polymer of interest are passed through a packed column containing uniformly crosslinked polystyrene gel. The abscissa on a typical chromatogram from this process is usually calibrated in angstrom units, and refers to the average size of the species used to calibrate the GPC chromatogram, which in the practice of the present invention was soluble in the carrier, tetrahydrofuran. The ordinate is proportional to the weight of polymeric species eluting at a particular time.

All of these examples were performed in a closed vessel so as to exclude water vapor which would hydrolyze the silane groups. The water present with the perchloric acid was a definite disadvantage to the performance of that material as some hydrolysis could not be avoided.

| Ex. | Catalyst | Reaction Conditions | % Low Mol Weight | kg/m$^2$ | Abr. Res. lbs/in$^2$ |
|---|---|---|---|---|---|
| 1 | (CF$_3$SO$_2$)$_2$CHC$_6$H$_5$* | A ~ 35° C | 12 | 22400 | 32 |
| 2 | φDS | D < 50° C | 13 | 21000 | 30 |
| 3 | φDS | C ~ 40° C | 16 | 21000 | 30 |
| 4 | φDS | A < 50° C | 19 | 21000 | 30 |
| 5 | SbF$_5$/φDS | A ~ 40° C | 24 | 19600 | 28 |

-continued

| Ex. | Catalyst | Reaction Conditions | % Low Mol Weight | kg/m$^2$ | Abr. Res. lbs/in$^2$ |
|---|---|---|---|---|---|
| 6 | φDS | C ~ 50° C | 25 | 18900 | 27 |
| 7 | BrDS** | C ~ 50° C | 25 | 18200 | 26 |
| 8 | (CF$_3$SO$_2$)$_2$CH$_2$ | A < 50° C | 26 | 18200 | 26 |
| 9 | SbF$_5$ | A < 50° C | 27 | 14000 | 20 |
| 10 | BrDS | A < 50° C | 31 | 11900 | 17 |
| 11 | HClO$_4$ | B > 100° C | 31 | 3500 | 5 |
| 12 | BrDS | A < 50° C | 32 | 11900 | 17 |
| 13 | φDS | C 75° C | 34 | 14000 | 20 |
| 14 | HClO$_4$ | B > 100° C | 33 | 2800 | 4 |
| 15 | BrAS*** | A ~ 50° C | 35 | 8400 | 12 |
| 16 | φDS | C 100° C | 36 | 9800 | 14 |
| 17 | (CF$_3$SO$_2$)$_2$CHBr | C 70° C | 39 | 8400 | 12 |
| 18 | (CF$_3$SO$_2$)$_2$CHBr | C 110° C | 43 | 4900 | 7 |
| 19 | φDS | A (1% MeOH) | 47 | 10500 | 15 |
| 20 | φDS | A (3% ethyleneglycol) | 57 | 700 | 1 |
| 21 | BF$_3$·ET$_2$O | B 60° C | 90 | 700 | 1 |

*hereinafter φDS
**BrDS is (CF$_3$SO$_2$)$_2$CHCH$_2$CBr(COOCH$_2$CH$_3$)$_2$
***BrAS is (CF$_3$SO$_2$)$_2$CHCH$_2$CHBrCOOH Three conclusions can be drawn from the data of these examples. A clear correlation between the percent of low molecular weight materials in the epoxy prepolymer and the final abrasion resistance of the cured product can be seen, independent of the method of cure and minimally dependent upon the catalyst used. The products using the highly fluorinated alkyl sulfonyl protonic acids tend to be significantly better than the finally cured products using perchloric acid, even given approximately the same percentages of lower molecular weight materials. This latter conclusion indicates one of the reasons why the highly fluorinated alkyl sulfonyl and sulfonic acid catalysts of U.S. Ser. No. 556,392 are the present catalysts of choice. In the presence of these catalysts, low molecular weight percentages up to 50% may be tolerated while generally in the practice of this invention only 40.0% low molecular weight materials may be tolerated, 35% or 30% is preferred and 26% is most preferred as the maximum tolerable amount. In all percentages, the compositions must be storage stable as herein defined.

It also appears from the replication of the examples of U.S. Pat. No. 3,955,035 that prepolymers having the small percentages of low molecular weight materials required according to the present invention are not taught by that patent and that the final cured products suffer as a consequence. The catalyst of that patent giving the best abrasion resistant coating (the perchloric acid) inherently produces an unstable prepolymer and no other catalyst disclosed therein produces prepolymer having comparable low percentages of low molecular weight materials.

Copolymerizable materials should be limited to 40% preferably 20% to 0%, by weight of the epoxy-terminated silane compositions. Large amounts of inert solvents or inert (not reactive with epoxy or silane groups) additives (such as flow control agents, surface active agents, viscosity modifiers, spreading aids, dyestuffs, etc.) are of course tolerable. The preferred epoxy-terminated silanes are those represented by the formula:

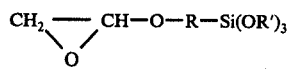

wherein R is an alkylene group of up to 4 carbon atoms and R' is an alkyl group of up to 6 carbon atoms. These may be blended with other epoxy terminated silanes and monomers to adjust the physical properties of the final coating.

Reference to the Figures will help to graphically describe some of the differences between the prior art and the present invention.

FIG. I shows the relative amount of material (ordinate) versus the size of the material (abscissa) generated by different methods of catalysis on epoxy-terminated silane compositions (3-glycidoxypropyltrimethoxy silane is used as the monomer). The monomer used in plot number 5) was diluted to 33% by weight in methylene chloride before polymerization. The reduction in lower molecular weight portions by the highly fluorinated aliphatic sulfonylic catalysts and perchloric acid can readily be seen in comparison to the other catalysts.

FIG. II shows similar comparisons as FIG. I. The ineffectiveness of perchloric acid at room temperature curing conditions is shown.

FIG. III illustrates the dependence of abrasion resistance on low molecular weight portions of the prepolymers prepared from 3-glycidoxypropyltrimethoxy silane. The superiority of the highly fluorinated aliphatic sulfonylic catalysts is shown here also.

The following examples show the utility of copolymers of the epoxy-terminated silanes and additives are shown. In the first four examples (22–25) 90/10 mixtures of gamma-glycidoxypropyltrimethoxy silane and cyclohexene oxide (respectively) were used, and in the last three examples (26–28), 80/20 mixtures were used. All examples were prepolymerized below 40° C, and 1% of additive provided, where indicated.

| Ex. | Catalyst (1%) | Additive | Abr. Res. | % Adhesion |
|---|---|---|---|---|
| 22 | φDS | | 16 | 100 |
| 23 | φDS | SbCl₃ | 20 | 100 |
| 24 | φDS | φDS | 24 | 100 |
| 25 | φDS | φDS + 3% polyacrylate resin | 28 | 100 |
| 26 | φDS | | 6 | 90 |
| 27 | φDS | SbCl₃ | 14 | 85 |
| 28 | φDS | φDS | 14 | 95 |

It can be seen that the presence of comonomers and additives affect both the abrasion resistance and the adhesion of the coatings.

These examples clearly show the usefulness of different catalyst systems, curing systems and additives. Although samples containing increasing amounts of comonomers (such as cyclohexane oxide) gave lower abrasion resistance, they showed better weathering. All materials reactive with silane or epoxy groups, including epoxy-terminated silanes and prepolymers thereof, are included in those materials which must be less than 50 A as measured by the gel permeation chromatographic techniques described herein.

What is claimed is:

1. A prepolymer composition comprising an epoxy prepolymer of an epoxy-terminated silane, said composition characterized by (1) a viscosity of less than 15,000 cp at 25° C, (2) having less than 40% by weight of low molecular weight epoxy or silane reactive materials of less than 50 A, and 3) being storage stable in solution with methylene chloride in an anhydrous environment for at least 30 days at 25°–30° C at no more than 33% solids content.

2. The prepolymer composition of claim 1 wherein the viscosity is less than 10,000 cp at 25° C and has less than 35% weight of low molecular weight epoxy or silane reactive materials of less than 50 A.

3. The prepolymer composition of claim 1 wherein there is less than 30% by weight of said low molecular weight materials.

4. The prepolymer composition of claim 3 wherein the viscosity is less than 5,000 cp at 25° C.

5. The prepolymer composition of claim 1 wherein at least 80% by weight of all polymerizable materials comprise epoxy prepolymers derived from epoxy terminated silanes of the formulae:

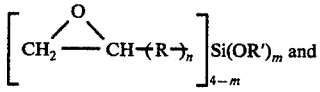

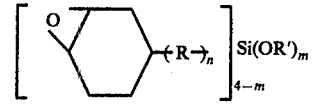

where R = a non-hydrolyzable divalent hydrocarbon radical (aliphatic, aromatic, or mixed aliphatic and aromatic of less than 20 carbon atoms or a divalent radical of less than 20 carbon atoms composed of C, H, S, and O atoms with only C, S, and O atoms in the backbone of the divalent radicals, with no two heteroatoms adjacent within the backbone of the divalent hydrocarbon radical, n is from 0 to 1, R' is an aliphatic hydrocarbon radical of less than 10 carbon atoms, an acyl radical of less than 10 carbon atoms, or a radical of formula $(CH_2CH_2O)_kZ$ in which k is an integer of at least 1 and Z is an aliphatic hydrocarbon radical of less than 10 carbon atoms or hydrogen, and m has values of 1 to 3.

6. The prepolymer composition of claim 1 wherein at least 80% by weight of all polymerizable materials comprises epoxy prepolymers derived from epoxy-terminated silanes of the formula

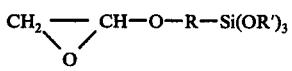

wherein R is an alkylene group of up to 4 carbon atoms and R' is an alkyl group of up to 6 carbon atoms.

7. The prepolymer composition of claim 5 having a viscosity at 25° C of less than 10,000 cp and less than 35% by weight of said low molecular weight materials.

8. The prepolymer composition of claim 6 having a viscosity at 25° C of less than 10,000 cp and less than 35% by weight of said low molecular weight materials.

9. The prepolymer of claim 5 having a viscosity at 25° C of less than 5,000 cp and less than 30% by weight of said low molecular weight materials.

10. The prepolymer of claim 6 having a viscosity at 25° C of less than 5,000 cp and less than 30% by weight of said low molecular weight materials.

11. The prepolymer composition of claim 1 further comprising a catalytically active amount of a catalyst of the formula:

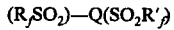

wherein Q is a divalent radical selected from

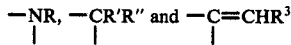

wherein R is hydrogen, ammonium cation or metal cation, wherein R" is selected from hydrogen, chlorine, bromine, iodine, $R_fSO_2-$, alkenyl of 3–4 carbon atoms, alkyl of 1 to 20 carbon atoms, aryl of 1 to 20 carbon atoms, and alkaryl of 7 to 20 carbon atoms, R' is selected from hydrogen, chlorine, bromine, iodine, ammonium cations or metal cations, and $R^3$ is H, alkenyl of 3 to 4 carbon atoms or aryl up to 20 carbon atoms, and $R_f$ and $R'_f$ are independently highly fluorinated aliphatic groups.

12. The prepolymer composition of claim 5 further comprising a catalytically active amount of a catalyst of the formula:

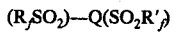

wherein Q is a divalent radical selected from

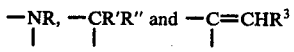

wherein R is hydrogen, ammonium cation or metal cation, wherein R" is selected from hydrogen, chlorine, bromine iodine, $R_fSO_2-$, alkenyl of 3–4 carbon atoms, alkyl of 1 to 20 carbon atoms, aryl of 1 to 20 carbon atoms, and alkaryl of 7 to 20 carbon atoms, R' is selected from hydrogen, chlorine, bromine, iodine, ammonium cations or metal cations, and $R^3$ is H, alkenyl of 3 to 4 carbon atoms or aryl up to 20 carbon atoms, and $R_f$ and $R'_f$ are independently highly fluorinated aliphatic groups.

13. The prepolymer composition of claim 6 further comprising a catalytically active amount of a catalyst of the formula:

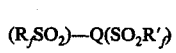

wherein Q is a divalent radical selected from

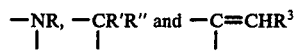

wherein R is hydrogen, ammonium cation or metal cation, wherein R" is selected from hydrogen, chlorine, bromine, iodine, $R_fSO_2-$, alkenyl of 3–4 carbon atoms, alkyl of 1 to 20 carbon atoms, aryl of 1 to 20 carbon atoms, and alkaryl of 7 to 20 carbon atoms, R' is selected from hydrogen, chlorine, bromine, iodine, ammonium cations or metal cations, and $R^3$ is H, alkenyl of 3 to 4 carbon atoms or aryl up to 20 carbon atoms, and $R_f$ and $R'_f$ are independently highly fluorinated aliphatic groups.

14. The prepolymer composition of claim 10 further comprising a catalytically active amount of a catalyst of the formula:

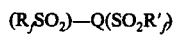

wherein Q is a divalent radical selected from

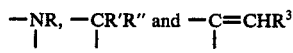

wherein R is hydrogen, ammonium cation or metal cation wherein R" is selected from hydrogen, chlorine, bromine, iodine, $R_fSO_2-$, alkenyl of 3–4 carbon atoms, alkyl of 1 to 20 carbon atoms, aryl of 1 to 20 carbon atoms, and alkaryl of 7 to 20 carbon atoms, R' is selected from hydrogen, chlorine, bromine, iodine, ammonium cations or metal cations, and $R^3$ is H, alkenyl of 3 to 4 carbon atoms or aryl up to 20 carbon atoms, and $R_f$ and $R'_f$ are independently highly fluorinated aliphatic groups.

15. The prepolymer composition of claim 12 having at least 90% by weight of said epoxy prepolymers.

16. The prepolymer composition of claim 13 further comprising a catalytically active amount of a catalyst of the formula:

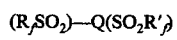

wherein Q is a divalent radical selected from

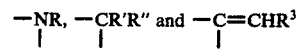

wherein R is hydrogen, ammonium cation or metal cation,
R" is selected from hydrogen, chlorine, bromine, iodine, $R_fSO_2-$, alkenyl of 3–4 carbon atoms, alkyl of 1 to 20 carbon atoms, aryl of 1 to 20 carbon atoms, and alkaryl of 7 to 20 carbon atoms, R' is selected from hydrogen, chlorine, bromine, iodine, ammonium cations or metal cations, and $R^3$ is H, alkenyl of 3 to 4 carbon atoms or aryl up to 20 carbon atoms, and $R_f$ and $R'_f$ are independently highly fluorinated aliphatic groups.

17. The prepolymer composition of claim 1 further comprising a catalytically active amount of a catalyst of the formula:

wherein $R_f$ and $R'_f$ are independently a highly fluorinated alkyl group, and Q is a divalent radical selected from —NH—, and —CHR—, wherein R is selected from Br, Cl, I, H, alkyl groups of 1 to 20 carbon atoms, alkenyl of 3 to 4 carbon atoms, aryl or aralkyl of up to 20 carbon atoms, or R'X, wherein R' is an alkylene group of up to 20 carbon atoms and X is H, Br, Cl, I, $-O_2SR_f$, $-CH(O_2SR_f)_2$,

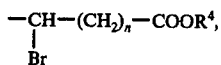

or $-CY(COOR^2)_2$ wherein $R^4$ is H or 1 to 8 alkyl and n is 0 to 8, and wherein $R^2$ is alkyl of 1 to 4 carbon atoms or phenylalkyl, the alkyl group of which has 1 to 4 carbon atoms, and Y is H, Br, Cl, I, or $NO_2$, $R_f$ and $R'_f$ are independently highly fluorinated aliphatic groups.

18. The prepolymer composition of claim 12 further comprising a catalytically active amount of a catalyst of the formula:

wherein $R_f$ and $R'_f$ are independently a highly fluorinated alkyl group, and Q is a divalent radical selected from —NH— and —CHR—, wherein R is selected from Br, Cl, I, H, alkyl groups, of 1 to 20 carbon atoms, alkenyl of 3 to 4 carbon atoms, aryl or aralkyl of up to 20 carbon atoms, or R'X, wherein R' is an alkylene group of up to 20 carbon atoms and X is H, Br, Cl, I, $-O_2SR_f$, $-CH(O_2SR_f)_2$,

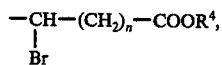

or $-CY(COOR^2)_2$ wherein $R^4$ is H or 1 to 8 alkyl and n is 0 to 8, and wherein $R^2$ is alkyl of 1 to 4 carbon atoms or phenylalkyl, the alkyl group of which has 1 to 4 carbon atoms, and Y is H, Br, Cl, I, or $NO_2$, $R_f$ and $R'_f$ are independently highly fluorinated aliphatic groups.

19. The prepolymer composition of claim 14 further comprising a catalytically active amount of a catalyst of the formula:

wherein $R_f$ and $R'_f$ are independently a highly fluorinated alkyl group, and Q is a divalent radical selected from —NH— and —CHR—, wherein R is selected from Br, Cl, I, H, alkyl groups of 1 to 20 carbon atoms, alkenyl of 3 to 4 carbon atoms, aryl or aralkyl of up to 20 carbon atoms, or R'X, wherein R' is an alkylene group of up to 20 carbon atoms and X is H, Br, Cl, I, $-O_2SR_f$, $-CH(O_2SR_f)_2$,

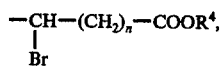

or $-CY(COOR^2)_2$ wherein $R^4$ is H or 1 to 8 alkyl and n is 0 to 8, and wherein $R^2$ is alkyl of 1 to 4 carbon atoms or phenylalkyl, the alkyl group of which has 1 to 4 carbon atoms, and Y is H, Br, Cl, I, or $NO_2$, $R_f$ and $R'_f$ are independently highly fluorinated aliphatic groups.

20. The prepolymer composition of claim 15 further comprising a catalytically active amount of a catalyst of the formula:

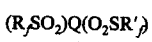

wherein $R_f$ and $R'_f$ are independently a highly fluorinated alkyl group, and Q is a divalent radical selected from —NH— and —CHR—, wherein R is selected from Br, Cl, I, H, alkyl groups of 1 to 20 carbon atoms, alkenyl of 3 to 4 carbon atoms, aryl or aralkyl of up to 20 carbon atoms, or R'X, wherein R' is an alkylene group of up to 20 carbon atoms and X is H, Br, Cl, I, $-O_2SR_f$, $-CH(O_2SR_f)_2$,

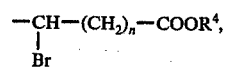

or $-CY(COOR^2)_2$ wherein $R^4$ is H or 1 to 8 alkyl and n is 0 to 8, and wherein $R^2$ is alkyl of 1 to 4 carbon atoms or phenylalkyl, the alkyl group of which has 1 to 4 carbon atoms, and Y is H, Br, Cl, I, or $NO_2$, $R_f$ and $R'_f$ are independently highly fluorinated aliphatic groups.

21. The prepolymer composition of claim 16 further comprising a catalytically active amount of a catalyst of the formula:

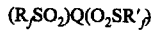

wherein $R_f$ and $R'_f$ are independently a highly fluorinated alkyl group, and Q is a divalent radical selected from —NH— and —CHR—, wherein R is selected from Br, Cl, I, H, alkyl groups of 1 to 20 carbon atoms, alkenyl of 3 to 4 carbon atoms, aryl or aralkyl of up to 20 carbon atoms, or R'X, wherein R' is an alkylene group of up to 20 carbon atoms and X is H, Br, Cl, I, $-O_2SR_f$, $-CH(O_2SR_f)_2$,

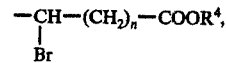

or $-CY(COOR^2)_2$ wherein $R^4$ is H or 1 to 8 alkyl and n is 0 to 8, and wherein $R^2$ is alkyl of 1 to 4 carbon atoms or phenylalkyl, the alkyl group of which has 1 to 4 carbon atoms, and Y is H, Br, Cl, I or $NO_2$, $R_f$ and $R'_f$ are independently highly fluorinated aliphatic groups.

22. A method of forming an abrasion resistant coating which comprises:
1. forming the prepolymer of claim 1,
2. coating said prepolymer onto a substrate, and
3. further curing said prepolymer into an abrasion resistant film by hydrolyzing the silane functionality thereof.

* * * * *

UNITED STATES PATENT AND TRADEMARK OFFICE
CERTIFICATE OF CORRECTION

PATENT NO. : 4,100,134
DATED : July 11, 1978
INVENTOR(S) : Janis Robins and J. LaMar Zollinger It is certified that error appears in the above-identified patent and that said Letters Patent are hereby corrected as shown below:

Column 4, line 26, "as compound" should be --as a compound--;

Column 8, line 56, "prepolymer" should be --prepolymers--;

Claim 5, Column 10, line 50, "aromatic of" should be --aromatic) of--.

Signed and Sealed this

Thirtieth Day of January 1979

[SEAL]

Attest:

RUTH C. MASON
Attesting Officer

DONALD W. BANNER
Commissioner of Patents and Trademarks